(12) United States Patent
Shinagawa

(10) Patent No.: US 8,817,014 B2
(45) Date of Patent: Aug. 26, 2014

(54) IMAGE DISPLAY OF A TUBULAR STRUCTURE

(75) Inventor: Yoshihisa Shinagawa, Downingtown, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 946 days.

(21) Appl. No.: 12/952,325

(22) Filed: Nov. 23, 2010

(65) Prior Publication Data

US 2011/0122134 A1    May 26, 2011

Related U.S. Application Data

(60) Provisional application No. 61/263,435, filed on Nov. 23, 2009.

(51) Int. Cl.
*G06T 15/00* (2011.01)
*G06T 15/08* (2011.01)
*G06T 3/00* (2006.01)

(52) U.S. Cl.
CPC .......... *G06T 15/08* (2013.01); *G06T 2215/06* (2013.01); *G06T 3/0031* (2013.01)
USPC ............ 345/419; 345/423; 345/428; 345/441

(58) Field of Classification Search
CPC .................. G06T 19/00; G06T 2207/30028
USPC .................. 345/419, 423, 426, 428, 441
See application file for complete search history.

(56) References Cited

U.S. PATENT DOCUMENTS

| 7,081,088 | B2 | 7/2006 | Geiger |
| 7,300,398 | B2 | 11/2007 | Chefd'hotel et al. |
| 7,457,444 | B2 | 11/2008 | Geiger et al. |
| 8,300,047 | B2 * | 10/2012 | Sudarsky et al. ............ 345/423 |
| 2009/0225077 | A1 | 9/2009 | Sudarsky et al. |

OTHER PUBLICATIONS

Bartroli et al, NonLinear Virtual Colon Unfolding, Proc. IEEE Visualization, pp. 411-420 (2001).*
Sudarsky et al, Colon Unfolding Via Skeletal Subspace Deformation, Medical Image Computing and Computer-Assisted intervention—MICCAI 2008, pp. 205-212 (2008).*
U.S. Appl. No. 12/879,038, filed Sep. 10, 2010.

* cited by examiner

*Primary Examiner* — Phu K Nguyen
(74) *Attorney, Agent, or Firm* — Peter R. Withstandley

(57) ABSTRACT

Described herein is a technology for facilitating visualization of a tubular structure. Digitized image data of the tubular structure is received and processed to determine a centerline. A first transformation operation is performed on a first set of coordinates representing the tubular structure to generate a transformed tubular structure with a straight centerline. A second transformation operation is then performed locally on a second set of coordinates representing at least one fold of the transformed tubular structure to generate a transformed fold, which is perpendicular to the centerline.

20 Claims, 8 Drawing Sheets

IMAGE DISPLAY OF A TUBULAR STRUCTURE

CROSS-REFERENCE TO RELATED APPLICATION

The present application claims the benefit of U.S. provisional application No. 61/263,435 filed Nov. 23, 2009, the entire contents of which are herein incorporated by reference.

TECHNICAL FIELD

The present disclosure relates generally to automated or partially-automated display of image data, and more particularly to image display of a tubular structure.

BACKGROUND

With the advent of sophisticated medical imaging modalities, such as Computed Tomography (CT), three-dimensional (3-D) volumetric data sets can be reconstructed from a series of two-dimensional (2-D) X-ray slices of an anatomical structure taken around an axis of rotation. Such 3-D volumetric data may be displayed using volume rendering techniques so as to allow a physician to view any point inside the anatomical structure, without the need to insert an instrument inside the patient's body.

One exemplary use of medical imaging is in the area of preventive medicine. For example, CT colonography (also known as virtual colonoscopy) is a valuable tool for early detection of colonic polyps that may later develop into colon cancer (or colorectal cancer). Studies have shown that early detection and removal of precursor polyps effectively prevent colon cancer. CT colonography uses CT scanning to obtain volume image data that represents the interior view of the colon (or large intestine). It is minimally invasive and more comfortable for patients than traditional optical colonoscopy. From CT image acquisitions of the patient's abdomen, the radiologist can inspect any suspicious polyps attached to the colon wall by examining reconstructions of individual planes of the image data or performing a virtual fly-through of the interior of the colon from the rectum to the cecum, thereby simulating a manual optical colonoscopy.

Both two-dimensional (2-D) and three-dimensional (3-D) views are often provided in CT colonography. 2-D views are typically cross-sectional representations of intensities occurring at a given slice. These 2-D images may be presented in the axial, coronal and sagittal planes. 3-D views present images with a volumetric appearance, similar to an optical colonoscopy. Although 3-D views allow the user to examine and detect any bumps on the colon walls, it is often very difficult to differentiate between true polyps and irrelevant structures such as residual stools or lipomas. 2-D views, on the other hand, provide the voxel intensities necessary to discriminate between these structures.

The problem with 2-D views, however, is that polyps behind or on the haustral folds are often missed because the haustral folds change their shapes drastically according to which cross sections are viewed. In many cases, polyps are dismissed as irrelevant when several cross-sectional images are examined, because the folds quickly move away when the slices to be viewed are changed. As a result, inspecting each fold is extremely time-consuming, and polyps occurring on the folds are very difficult to detect. Accordingly, the accuracy and sensitivity of computer-aided diagnosis and treatment of colon cancer are severely impaired by these shortcomings of conventional systems.

SUMMARY

A technology for facilitating visualization of a tubular structure is described herein. In one implementation, digitized image data of the tubular structure is received and processed to determine a centerline. A first transformation operation is performed on a first set of coordinates representing the tubular structure to generate a transformed tubular structure with a straight centerline. A second transformation operation is then performed locally on a second set of coordinates representing at least one fold of the transformed tubular structure to generate a transformed fold, which is perpendicular to the centerline.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. Furthermore, it should be noted that the same numbers are used throughout the drawings to reference like elements and features.

DETAILED DESCRIPTION

Figure 1:
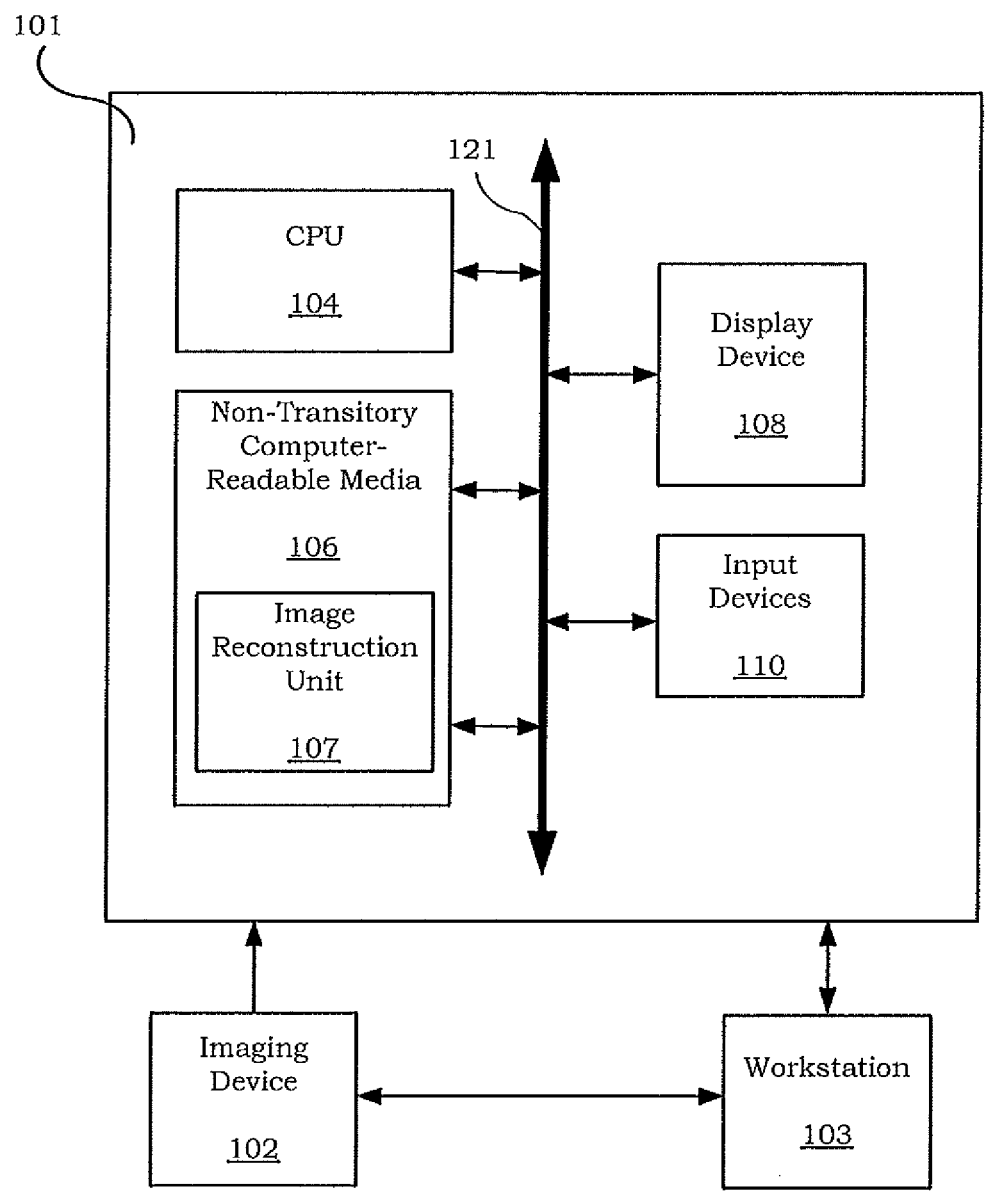
FIG. 1 shows an exemplary system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to X-Ray radiographs, MRI, CT, PET (positron emission tomography), PET-CT, SPECT, SPECT-CT, MR-PET, 3-D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulate and transform data represented as physical (e.g., electronic) quantities within the computer system's registers and memories into other data similarly represented as physical quantities within the computer system's memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The following description sets forth one or more implementations of systems and methods that facilitate visualization of image data. One implementation of the present framework reconstructs a cross-sectional image of a tubular structure (e.g., colon). First, a volume of image data containing the tubular structure may be deformed (or transformed) so that the centerline of the tubular structure is straightened. Second, sub-volumes containing folds of the tubular structure may each be locally deformed so that the folds are perpendicular to the centerline. The deformed tubular structure may be rotated about a longitudinal axis of a cylinder virtually disposed around the tubular structure. The present framework finds application in, for example, virtual colonoscopy using image data of the colon. In the cross-sectional view, polyps located on the wall of the colon, and particularly, on or behind the haustral fold, can be readily discovered.

It is understood that while a particular application directed to virtual colonoscopy is shown, the technology is not limited to the specific embodiment illustrated. The present technology has application to, for example, visualizing features in other types of luminal, hollow or tubular anatomical structures (e.g., airway, urinary gall bladder, blood vessel, trachea, intestine, etc.) or non-anatomical objects (e.g., fuel injection systems). In addition, the present technology has application to both medical applications and non-medical applications, such as geological surveying, manufacturing, and other engineering applications.

FIG. 1 is a block diagram illustrating an exemplary visualization system 100. The visualization system 100 includes a computer system 101 for implementing the framework as described herein. The computer system 101 may be further connected to an imaging device 102 and a workstation 103, over a wired or wireless network. The imaging device 102 may be a radiology scanner such as a magnetic resonance (MR) scanner or a CT scanner.

Computer system 101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 101 comprises a processor or central processing unit (CPU) 104 coupled to one or more non-transitory computer-readable media 106 (e.g., computer storage or memory), display device 108 (e.g., monitor) and various input devices 110 (e.g., mouse or keyboard) via an input-output interface 121. Computer system 101 may further include support circuits such as a cache, power supply, clock circuits and a communications bus. Even further, computer system 101 may be provided with a graphics controller chip, such as a graphics processing unit (GPU) that supports high performance graphics functions.

It is to be understood that the present technology may be implemented in various forms of hardware, software, firmware, special purpose processors, or a combination thereof. In one implementation, the techniques described herein are implemented by image reconstruction unit 107. Image reconstruction unit 107 may include computer-readable program code tangibly embodied in non-transitory computer-readable media 106. Non-transitory computer-readable media 106 may include random access memory (RAM), read only memory (ROM), magnetic floppy disk, flash memory, and other types of memories, or a combination thereof. The computer-readable program code is executed by CPU 104 to process images (e.g., MR or CT images) from imaging device 102 (e.g., MR or CT scanner). As such, the computer system 101 is a general-purpose computer system that becomes a specific purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein.

In one implementation, computer system 101 also includes an operating system and microinstruction code. The various techniques described herein may be implemented either as part of the microinstruction code or as part of an application program or software product, or a combination thereof, which is executed via the operating system. Various other peripheral devices, such as additional data storage devices, and printing devices, may be connected to the computer system 101.

The workstation 103 may include a computer and appropriate peripherals, such as a keyboard and display, and can be operated in conjunction with the entire system 100. For example, the workstation 103 may communicate with the imaging device 102 so that the image data collected by the imaging device 102 can be rendered at the workstation 103 and viewed on the display. The workstation 103 may include a user interface that allows the radiologist or any other skilled user (e.g., physician, technician, operator, scientist, etc.), to manipulate the image data. For example, the user may identify regions of interest in the image data, or annotate the regions of interest using pre-defined descriptors via the user-interface. Further, the workstation 103 may communicate directly with computer system 101 to display processed image data. For example, a radiologist can interactively manipulate the displayed representation of the processed image data and view it from various viewpoints and in various reading modes.

Figure 2:
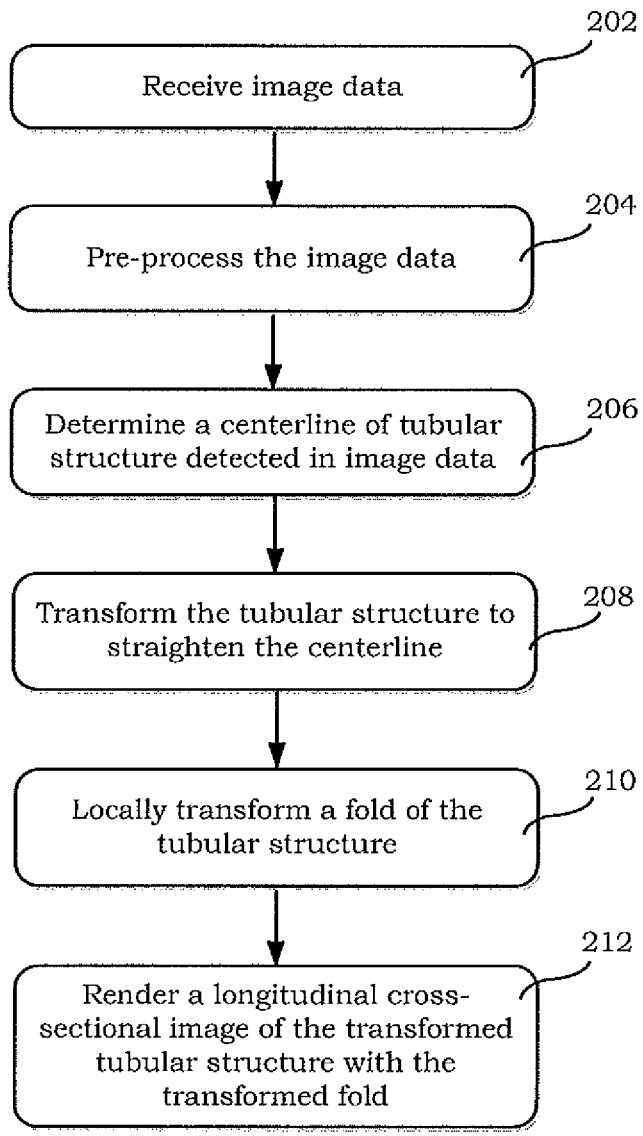
FIG. 2 shows an exemplary method.

FIG. 2 shows an exemplary method 200 of displaying a cross-sectional view of a tubular structure. The exemplary method 200 may be implemented by the image reconstruction unit 107 in computer system 101, previously described with reference to FIG. 1. FIGS. 3-5 illustrate an exemplary tubular structure during various stages of transformation in accordance with the method 200.

At step 202, the computer system 101 receives image data of a tubular structure. The image data includes one or more digitized images acquired by, for example, imaging device 102. The imaging device 102 may acquire the images by techniques that include, but are not limited to, magnetic resonance (MR) imaging, computed tomography (CT), helical CT, x-ray, positron emission tomography, fluoroscopic, ultrasound or single photon emission computed tomography (SPECT). The images may include one or more intensity values that indicate certain material properties. For example, CT images include intensity values indicating radiodensity measured in Hounsfield Units (HU). Other types of material properties may also be associated with the intensity values. The images may be binary (e.g., black and white) or grayscale. In addition, the images may comprise two dimensions, three dimensions, four dimensions or any other number of dimensions. The tubular structure may be any lumen-defining structure, such as a colon, blood vessel, bladder, trachea, intestine or any other anatomical structure. In addition, the tubular structure may also be a non-anatomical structure.

At 204, the image data is pre-processed, either automatically by the computer system 101, manually by a skilled user (e.g., radiologist), or a combination thereof. Various types of pre-processing may be performed. For example, the images may be pre-filtered to remove noise artifacts or to enhance the quality of the images for ease of evaluation. Other types of filtering or pre-processing may also be performed.

In one implementation, pre-processing includes segmenting the image data into a region of interest (ROI). An ROI is an area or volume identified for further study and examination. Such ROI may represent at least a portion of a tubular structure (e.g., colon). The ROT may be automatically detected by the computer system 101 using a computer-aided detection (CAD) technique, such as one that detects points where the change in intensity exceeds a certain threshold. Alternatively, the ROI may be identified by a skilled user via, for example, a user-interface at the workstation 103. The ROIs may also be tagged, annotated or marked for emphasis or to provide additional textual information so as to facilitate interpretation.

In addition, the pre-processing may also include detecting or identifying folds associated with the tubular structure. In the context of virtual colonoscopy, for example, haustral folds may be detected. Folds may be detected by a region growing process. In one implementation, seed points for region growing may be identified on the surface of the structure where curvature characteristics correspond to a hyperbolic curve. An exemplary region growing process is described in U.S. patent application Ser. No. 12/879,038, filed on Sep. 10, 2010, which is hereby incorporated by reference. Other methods may also be used to detect the folds.

Figure 3A:
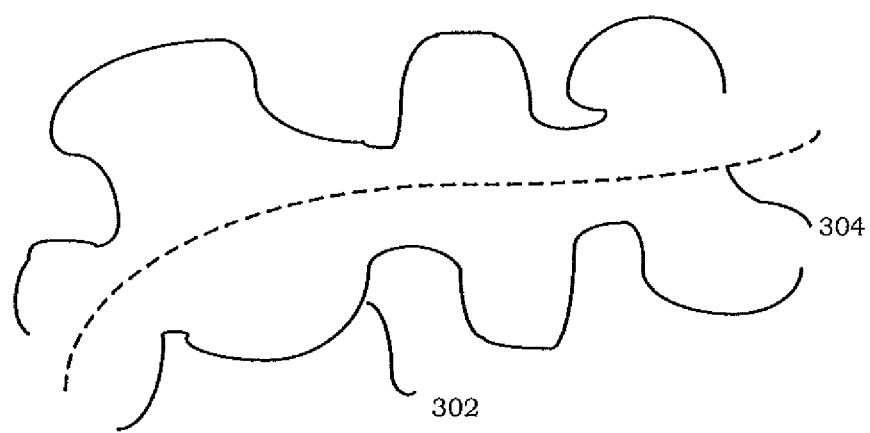
FIGS. 3a-c show an exemplary tubular structure during various stages of transformation.

At 206, the image reconstruction unit 107 determines a centerline of a tubular structure 302 detected in the image data. FIG. 3a illustrates an exemplary 3-D tubular structure 302 with a centerline 304. The centerline 304 may be represented by a skeleton or a medial axis. In one implementation, the centerline 304 is defined as a thin representation that is equidistant from at least two or three voxels on the structure's boundary surface (or inner wall surface). Alternatively, the centerline may be defined as the locus of the centers of maximal spheres contained in the structure 302.

Various techniques may be employed to compute the centerline 304. For example, skeletonization methods, such as distance transform, morphological thinning, path planning, flux-driven methods, extraction from level sets, and so forth, may be applied. See, for example, the following patents, which are hereby incorporated by reference: U.S. Pat. No. 7,081,088 entitled "Method and apparatus for automatic local path planning for virtual colonoscopy"; U.S. Pat. No. 7,457,444 entitled "Method and apparatus for fast automatic centerline extraction for virtual endoscopy"; and U.S. Pat. No. 7,300,398 entitled "Method and apparatus for registration of virtual endoscopic images."

Figure 3B:
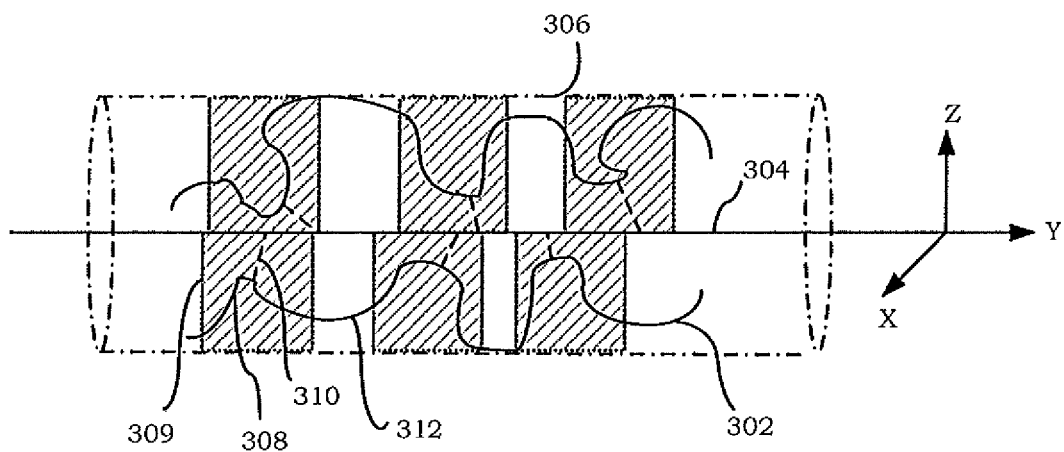

Referring back to FIG. 2, at 208, the image reconstruction unit 107 performs a first transformation (or deformation) operation on a first set of coordinates representing the tubular structure 302. A transformed tubular structure 302 with a straight centerline 304 is generated as a result. This straightening step unfolds the tubular structure 302 into a longitudinal structure, which may be approximated by a hypothetical bounding cylinder. For purposes of illustration, FIGS. 3a and 3b show the tubular structure 302 before and after the first transformation respectively. As shown, a hypothetical cylinder 306 may be virtually disposed around the tubular structure 302. In one implementation, the hypothetical cylinder 306 has a constant radius and an associated global coordinate system. In one implementation, the global coordinate system comprises a Cartesian coordinate system defined by orthogonal X, Y and Z axes. The centerline 304 of the tubular structure 302 may serve as the longitudinal Y-axis of the hypothetical cylinder 306. It is understood that other types of coordinate systems may also be used.

The straightening of the centerline 304 may be achieved by performing a series of one or more affine transformation operations on the first set of coordinates associated with the tubular structure 302. An affine transformation is a geometric transformation that preserves the co-linearity between points and the ratios of distances along a line. An affine transformation may include a linear transformation (e.g., rotation, scaling, shear) and a translation (or shift). The affine transformation may be performed on sub-volumes along the centerline. The parameters of the affine transformation may be determined so that the centerline 304 becomes a straight line. It is understood that various other techniques, such as uniform sampling, conformal mapping, distance transform, mesh skinning or skeletal subspace deformation, may be employed to straighten the centerline 304. See, for example, U.S. patent application Ser. No. 12/398,220, filed on Mar. 5, 2009, which is hereby incorporated by reference.

Figure 3C:
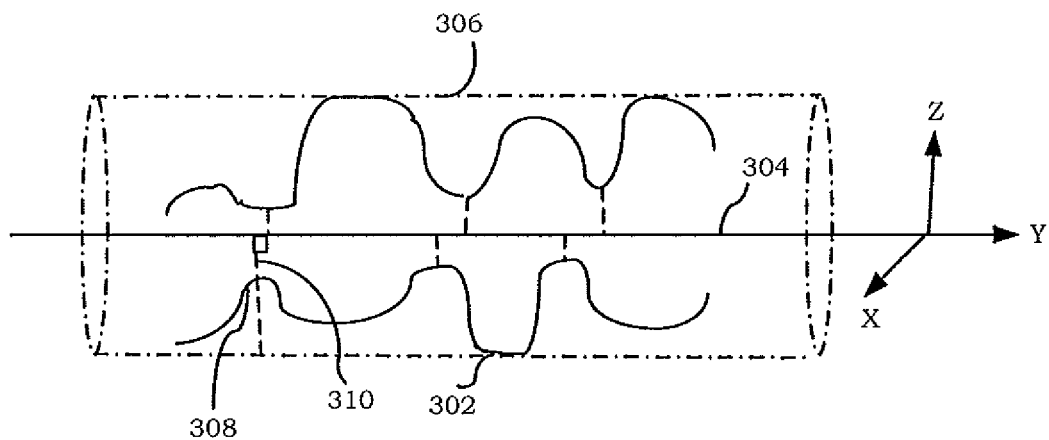

Referring to FIG. 2, at 210, the image reconstruction unit 107 performs second transformation operation locally on a second set of coordinates. The second set of coordinates represents a fold of the transformed tubular structure 302. The transformation generates a transformed fold that is perpendicular to the centerline 304. FIGS. 3b-c show the tubular structure 302 before and after such local transformation respectively. As shown, each fold segment 308 may be localized in a sub-volume 309 (depicted by hatched lines). The sub-volume 309 may be a pre-determined sub-volume, such as a cubic sub-volume (e.g., 20×20×20 mm) centered at the centroid of the fold.

The local transformation may be performed on voxels in each sub-volume 309, such that the vertical z-axis 310 of the fold 308 becomes perpendicular relative to the longitudinal Y-axis. In addition, the intermediary segments 312 between the folds 308 may be locally transformed to maintain the natural continuity of the surface of the tubular structure 302. In one implementation, a linear interpolation operation is performed on the intermediary segments 312. Other types of interpolation operations; such as tri-linear or tri-cubic interpolation operations, may also be performed.

After performing such local transformation operations, the folds 308 will be substantially stationary when projected on a longitudinal plane rotating about the Y axis, as will be described later. Such feature advantageously facilitates the detection of inconspicuous polyps as subtle bumps on the folds. Regions behind the folds, which would otherwise be occluded in conventional systems, will also be exposed for examination. This capability is especially useful in, for example, virtual colonoscopy, where polyps are commonly hidden behind the haustral folds.

Figure 4A:
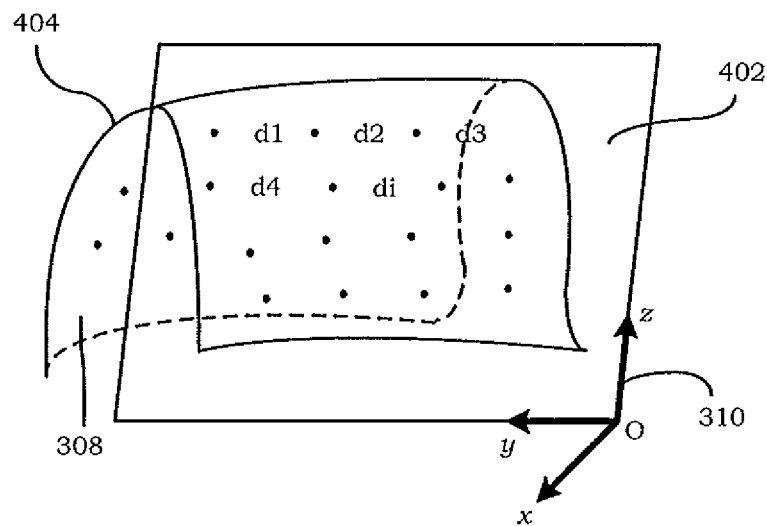
FIGS. 4a-b illustrate the local transformation of an exemplary fold.

FIGS. 4a and b illustrate the local transformation of the fold 308 in further detail. In particular, FIGS. 4a and b show a perspective view and a cross-sectional view of the fold 308 respectively. Referring to FIG. 4a, a plane 402 dividing the fold 308 substantially equally into two portions may first be determined. The dividing plane 402 may be determined by using a least squares method. In one implementation, the least squares method minimizes the sum of squared distances to the plane 402 from a given set of points $\{d1, d2, d3, \ldots, di\}$ disposed throughout the surface 404 of the fold 308. In other words, the dividing plane 402 may be defined by one or more points that best fit the set of points $\{d1, d2, d3, \ldots, di\}$ on the fold surface 404. Such best fit points are determined by optimizing the minimum sum $$S = \left(\sum_{i=1}^{n} d_i^2\right).$$

The optimization may be performed by, for example, solving a matrix eigenvalue problem. Other methods of computing the dividing plane 402 are also useful.

The fold 308 may be associated with a local coordinate system. In one implementation, the local coordinate system comprises a Cartesian coordinate system with origin O and orthogonal x-, y- and z-axes. The origin O of the local coordinate system may be arbitrarily selected. Alternatively, the centroid of the points on the fold surface 404 (as depicted in FIG. 4a) may serve as the origin O. In addition, the normal vector of the dividing plane 402 may serve as the x-axis, and two perpendicular vectors lying on the dividing plane 402 may serve as the y- and z-axes. One way of determining the y-axis is to compute a line that minimizes the squared distances from each point on the fold surface 404 to the line. It is understood that other types of coordinate systems may also be used.

Figure 4B:
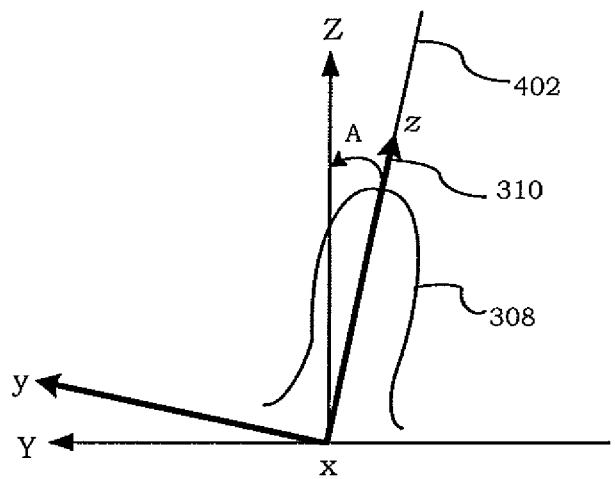

After the dividing plane 402 is defined, a series of one or more local transformations may then be applied to the coordinates of the fold 308 so as to align the local z-axis with the global Z-axis of the hypothetical cylinder 306. As shown in FIG. 4b, the fold structure 308 may be rotated by an angle A about the local x-axis. The series of local transformations include, for example, one or more affine transformations. The z-axis 310 of the transformed fold 308 will be perpendicular to the longitudinal Y-axis 304 of the hypothetical cylinder 306, as illustrated by FIG. 3c.

Figure 5A:
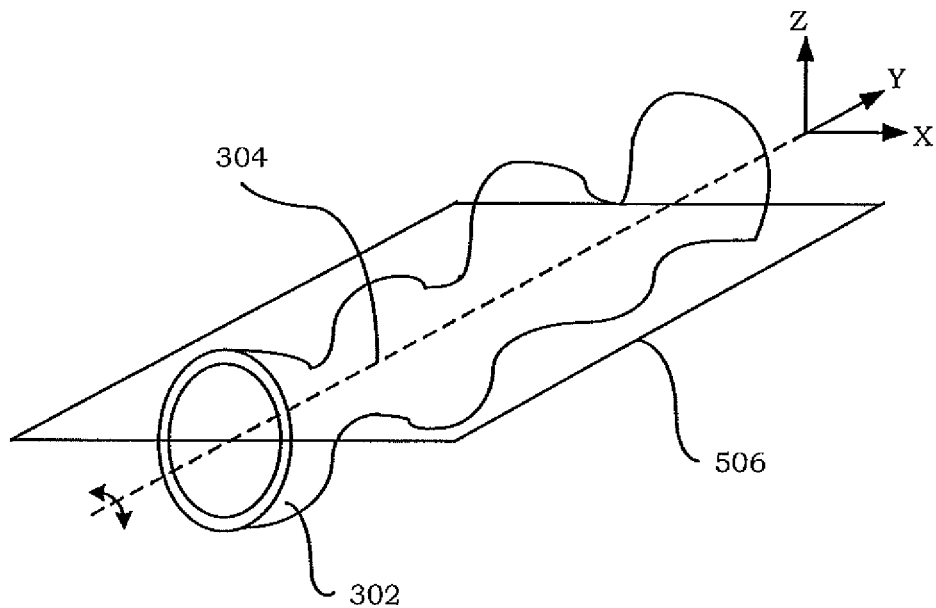
FIG. 5a shows a perspective view of an exemplary slice plane.

Referring back to FIG. 2, at 212, a longitudinal cross-sectional image of the tubular structure is rendered. The cross-sectional image may be generated by re-sampling the volumetric image data on a slice plane oriented along the longitudinal axis of the hypothetical cylinder. FIG. 5a shows a perspective view of the slice plane 506. As shown, the slice plane 506 passes through the global longitudinal Y-axis (or centerline 304). The slice plane 506 may be rotated about the global Y-axis to change the resulting cross-sectional image 509 viewed on the display device. In one implementation, the rotation is performed in response to user commands. The user commands may be received by the computer system 101 from, for example, an observer at a workstation 103 with a corresponding user interface (e.g., mouse, keyboard, graphical user interface).

Figure 5B:
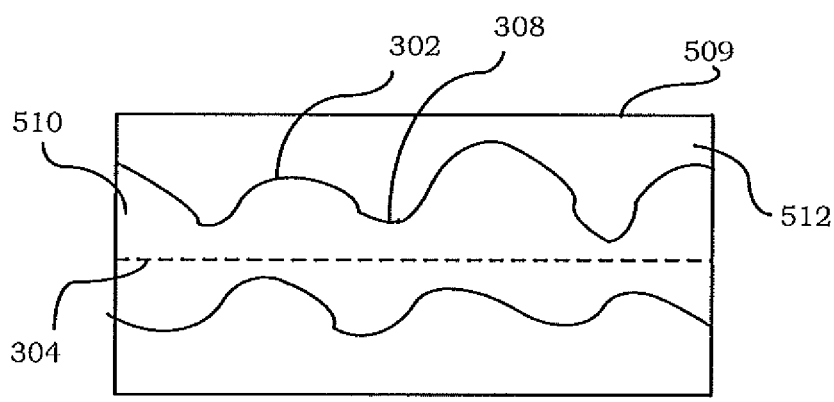
FIG. 5b shows an exemplary cross-sectional image.

FIG. 5b shows the corresponding cross-sectional slice image 509 output by, for example, computer system 101. As shown, the cross-sectional slice image 509 includes a representation 510 of the tubular structure 302 with folds 308 that are perpendicular to the longitudinal axis 304. The representation 510 may be a three-dimensional (3-D) surface rendering of the tubular structure 302. The 3-D representation provides useful geometric information (e.g., width, depth, height) about the tubular structure 302. In addition, a two-dimensional (2-D) representation of the periphery region 512 of the tubular structure may be displayed. The intensity (or brightness) of the pixels in the 2-D representation may provide indications of the material properties (e.g., densities) of the tissues on or surrounding the tubular structure 302. The pixels in the 2-D representation may also be color-coded in accordance with a transfer function to facilitate differentiation between the different types of tissue.

The slice image 509 may be generated by performing one or more volume rendering techniques, volume ray casting, ray tracing, splatting, shear warping, texture mapping, or a combination thereof. For example, a ray may be projected from a viewpoint for each pixel in the frame buffer into a volume reconstructed from the image data. As the ray is cast, it traverses through the voxels along its path and accumulates visual properties (e.g., color, transparency) based on the transfer function and the effect of the light sources in the scene. The slice image 509 is rendered for display on, for example, output display device 108. In addition, the rendered image 509 may be stored in a raw binary format, such as the Digital Imaging and Communications in Medicine (DICOM) or any other file format suitable for reading and rendering image data for display and visualization purposes.

Figure 6:
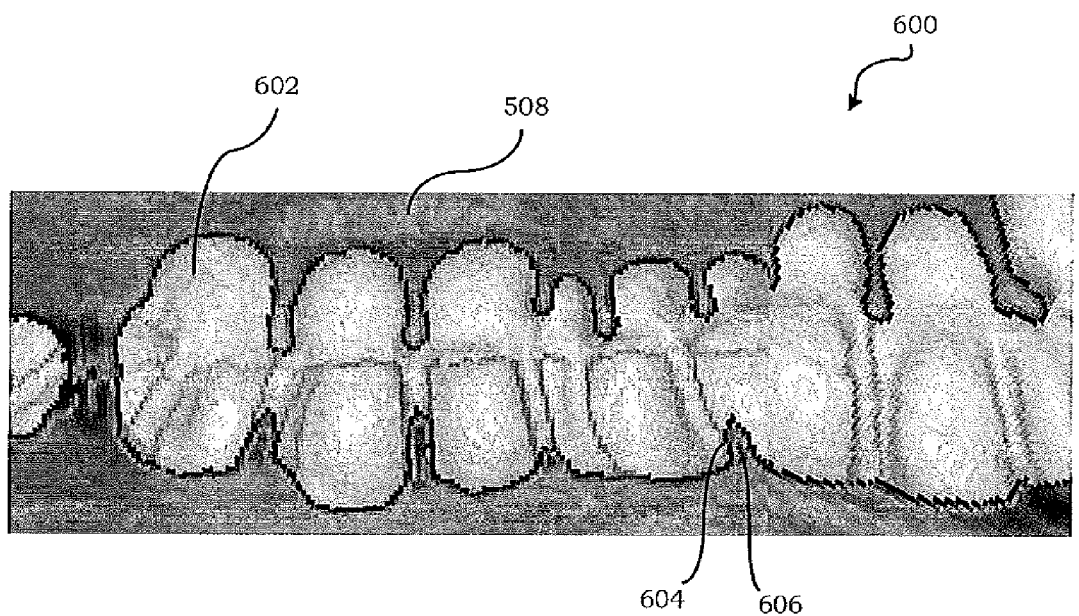
FIG. 6 shows an example of a cross-sectional image of a portion of a colon.

FIG. 6 shows an example of a cross-sectional image 600 of a portion of a colon that can be reconstructed using the method 200. As shown, the cross-sectional image 600 comprises a 3-D representation 602 of a portion of a colon along the longitudinal axis. Unlike conventional fillet views, haustral folds 604 are easily seen. In this view, haustral folds 604 are locally perpendicular to the longitudinal axis, such that the folds 604 are substantially stationary when the slices to be viewed are changed or rotated about the longitudinal axis. An advantage of this cross-sectional view is that significantly large portions of the haustral folds can be viewed in a single image. Accordingly, any polyps located on or behind the folds can easily be detected.

Figure 7:
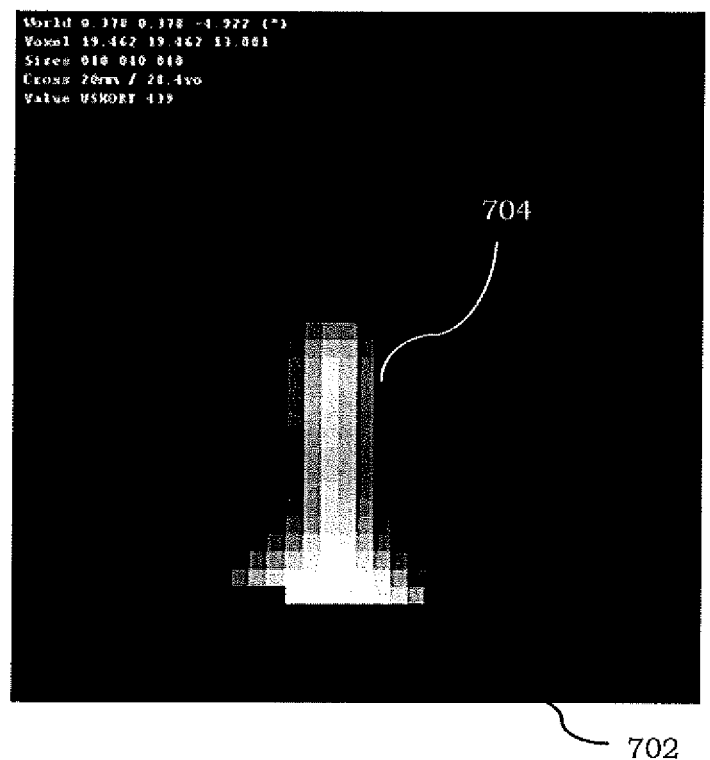
FIG. 7 shows an image of a periphery region associated with an exemplary transformed fold.

FIG. 7 shows another image 702 which magnifies a periphery region associated with exemplary transformed vertical fold. As shown, voxel intensities within the periphery region 704 of the vertical fold are visible, thereby facilitating the discrimination between polyps and irrelevant structures (e.g., lipomas or residual stool). In addition, any polyps located on or behind the fold can easily be detected by examining the voxel intensities. These features greatly enhance the accuracy and sensitivity of computer-aided detection of cancer.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method performed by a computer system for visualizing a tubular structure, comprising:
   (i) receiving digitized image data of the tubular structure;
   (ii) determining a centerline of the tubular structure;
   (iii) performing a first transformation operation on a first set of coordinates representing the tubular structure to generate a transformed tubular structure with a straight centerline;
   (iv) defining a local axis of a fold of the transformed tubular structure, wherein the local axis lies on a dividing plane that divides the fold substantially equally into two portions; and
   (v) performing a second transformation operation locally on a second set of coordinates representing the fold of the transformed tubular structure to generate a transformed fold, wherein the local axis of the transformed fold is perpendicular to the centerline.

2. The method of claim 1 further comprising:
   acquiring, by an imaging device, the image data by computed tomography (CT).

3. The method of claim 1 wherein the tubular structure comprises a colon.

4. The method of claim 1 further comprising:
   segmenting the image data into a region of interest, wherein the region of interest represents at least a portion of the tubular structure.

5. The method of claim 4 further comprising detecting the at least one fold by a region growing process.

6. The method of claim 1 wherein the first transformation operation comprises an affine transformation operation.

7. The method of claim 1 further comprising performing an interpolation operation on segment coordinates representing a segment between two folds of the tubular structure.

8. The method of claim 1 wherein the local axis defines a local Cartesian coordinate system.

9. The method of claim 1 wherein the defining the local axis comprises determining the dividing plane by performing a least squares method.

10. The method of claim 1 wherein the second transformation operation comprises one or more affine transformation operations.

11. The method of claim 10 wherein the one or more affine transformation operations comprise at least one rotation operation.

12. The method of claim 1 further comprising rendering a longitudinal cross-sectional image of the transformed tubular structure with the transformed fold.

13. The method of claim 12 wherein the rendering comprises displaying voxel intensities associated with a periphery region of the transformed tubular structure with the transformed fold.

14. The method of claim 13 wherein the rendering comprises generating a three-dimensional surface rendering of the transformed tubular structure with the transformed fold.

15. The method of claim 12 wherein the rendering comprises generating a three-dimensional surface rendering of the transformed tubular structure with the transformed fold.

16. The method of claim 12 wherein the rendering comprises:
   receiving a user command;
   rotating a slice plane about the centerline in response to the user command; and
   re-sampling the image data on the slice plane to generate the longitudinal cross-sectional image.

17. The method of claim 16 wherein the rendering further comprises generating a three-dimensional surface rendering of the transformed tubular structure with the transformed fold.

18. The method of claim 17 wherein the rendering further comprises displaying voxel intensities associated with a periphery region of the tubular structure with the transformed fold.

19. A non-transitory computer readable medium embodying a program of instructions executable by machine to perform steps for visualization, the steps comprising:
   (i) receiving digitized image data of a tubular structure;
   (ii) determining a centerline of the tubular structure;
   (iii) performing a first transformation operation on a first set of coordinates representing the tubular structure to generate a transformed tubular structure with a straight centerline;
   (iv) defining a local axis of a fold of the transformed tubular structure, wherein the local axis lies on a dividing plane that divides the fold substantially equally into two portions; and
   (v) performing a second transformation operation locally on a second set of coordinates representing the fold of the transformed tubular structure to generate a transformed fold, wherein the local axis of the transformed fold is perpendicular to the centerline.

20. A visualization system, comprising:
   a memory device for storing computer readable program code; and
   a processor in communication with the memory device, the processor being operative with the computer readable program code to:
   (i) receive digitized image data of a tubular structure;
   (ii) determine a centerline of the tubular structure;
   (iii) perform a first transformation operation on a first set of coordinates representing the tubular structure to generate a transformed tubular structure with a straight centerline;
   (iv) define a local axis of a fold of the transformed tubular structure, wherein the local axis lies on a dividing plane that divides the fold substantially equally into two portions; and
   (v) perform a second transformation operation locally on a second set of coordinates representing the fold of the transformed tubular structure to generate a transformed fold, wherein the local axis of the transformed fold is perpendicular to the centerline.

* * * * *